United States Patent Office 2,947,645
Patented Aug. 2, 1960

2,947,645

STABLE CELLULOSE ETHER COMPOSITIONS AND METHOD FOR PRODUCING THE SAME

David T. Milne, Deventer, Netherlands, assignor to American Viscose Corporation, Philadelphia, Pa., a corporation of Delaware No Drawing. Filed Oct. 29, 1957, Ser. No. 693,012

10 Claims. (Cl. 106—170)

This invention relates to alkali-soluble cellulose ethers and has for its general object the production of stable aqueous compositions having a pH from 5 to 9 comprising water-insoluble, alkali-soluble cellulose ethers.

It is known to produce cellulose ethers which are soluble in aqueous alkaline solutions. However, such cellulose ether solutions are not useful or desirable for many purposes where the slightest amount of free caustic alkali may be harmful.

In the normal commercial application of known water-insolubles, alkali-soluble cellulose ethers to the production of shaped articles such as filaments, fibers, foils, and the like, or in the coating or finishing of shaped articles, etc., the alkali-soluble cellulose ethers are generally used in the form of their aqueous alkaline solutions which necessitates the subsequent step of treating with an acid to neutralize the alkali and thus liberate or precipitate the cellulose ether. Further, solutions in aqueous caustic of the water-insoluble, alkali-soluble cellulose ethers that have heretofore been produced commercially are coagulated when the caustic alkali is diluted or is partially neutralized.

It is also well known to produce water-soluble cellulose ethers which are also soluble in dilute aqueous alkaline solutions. Aside from the obvious disadvantage of their water solubility for many purposes, these water-soluble cellulose ethers present the problem that they cannot be economically recovered from the reaction mass. The cellulose ethers are formed by reacting upon cellulose with a suitable etherifying agent in the presence of an alkali, such as sodium hydroxide. The resultant reaction mass comprises the cellulose ether and impurities formed during the reaction comprising alkali reaction products and alkali. When the cellulose ether is water-soluble, it can only be purified by extraction with relatively expensive organic solvents, e.g. alcohol, or by dialysis.

It is an object of the present invention to produce stable aqueous compositions having a pH from 5 to 9 comprising water-insoluble, alkali-soluble cellulose ethers and containing no free caustic alkali.

Another object of the present invention is to produce substantially neutral or acid aqueous compositions comprising water-insoluble, alkali-soluble cellulose ethers which can be formed into shaped articles or applied as coatings, sizings, by extrusion, casting, coating or the like followed by evaporation of the solvent without requiring treatment with an acid, or the like.

It has been discovered that certain alkali-soluble, water-insoluble cellulose ethers, namely, those soluble in 0.5 to 4% aqueous alkaline solutions, such as of sodium hydroxide, when dissolved in such solutions, remain in solution when the free caustic alkali is completely neutralized or the neutralized solution is adjusted to a pH of from 5 to 9. Also, a stable colloidal solution or dispersion of the water-insoluble, alkali-soluble cellulose ether is maintained when the 0.5 to 4% aqueous alkaline solution of the same is diluted below 0.5% concentration.

The neutralization and/or the subsequent adjustment may be accomplished by means of an acid, acid salt, ammonium salt, or reaction with ethylene chlorohydrin, sodium chloroacetate, etc.

When alkaline solutions of the above-named cellulose ethers are neutralized, there is also formed an alkali salt of the acid used, for example, sodium acetate, sodium borate, potassium acetate, etc., which may or may not be removed since these colloidal solutions are directly useable in the form in which they are produced. Further, while these salts yield basic solutions, the pH of these solutions is not over 9 and is below the usual range of aqueous solutions of caustic alkalies which contain enough alkali to be harmful for many purposes. The presence of very small amounts of caustic alkalies in aqueous solutions results in high pH values, for example, 0.4% aqueous sodium hydroxide solution has a pH of 13, 0.04% a pH of 12, and 0.004% a pH of 11. Therefore, the presence of the salts formed by neutralization or acidification are not harmful since the basicity of solutions containing the same is not caused by free caustic alkali. Material treated with these solutions having a pH as high as 9 need not be subsequently treated with an acid to reduce the pH since the material would not be damaged during drying with heat and the dried material would not be harmfully alkaline, such as would be the case if the basicity were due to free caustic alkali.

The remarkable feature of the present invention lies in the discovery that these water-insoluble, alkali-soluble cellulose ethers are not coagulated or gelled when the free alkali of alkaline solutions of the same are neutralized with or without additional adjustment to a pH between 5 and 9 but the ethers remain dispersed in the substantially neutral or acid aqueous media. It has been discovered that the presence of free caustic alkali is not needed to maintain solution stability of these ethers.

The cellulose ethers of the present invention, which are soluble in aqueous solutions containing 0.5 to 4.0% sodium hydroxide or other suitable alkali, can be obtained directly from cellulose, or they may be produced from intermediate low substituted cellulose ethers which are soluble in aqueous alkaline solutions of 5 to 10% concentration. In either case, as the initial starting material, there may be used cellulose in any of its natural forms and cellulose conversion products such as oxycellulose, hydrocellulose and cellulose hydrates of all kinds. It is preferable but not necessary that the cellulose be converted to alkali cellulose which may be accomplished in the usual known manner. The cellulose or alkali cellulose is etherified by acting upon it with a suitable etherifying agent, in vapor or liquid form, in the presence of an aqueous alkaline solution. The initial product obtained, which may or may not be separated is an intermediate low-substituted cellulose ether soluble in aqueous alkaline solutions of 5 to 10% concentration. The etherification is thereafter continued until a higher substituted ether is produced which is soluble in aqueous alkaline solutions of 0.5 to 4.0% concentration and insoluble in water. For example, the low-substituted cellulose ether, i.e., one which is soluble in aqueous alkaline solutions of 5 to 10% concentration, is recovered or separated, with or without partial or complete drying, from the original reaction mass in the usual manner, and then converted to an ether of the desired higher degree of substitution by dissolving or dispersing it in or mixing it with an aqueous alkaline liquid containing a small amount of alkali, for example, an aqueous alkaline solution of an alkali metal hydroxide or of an organic nitrogen base of 1 or 2% concentration based on the total reaction mass, adding an etherifying compound which may be an alkylating, hydroxyalkylating, or carboxyalkylating agent to the solution, dispersion, or mixture, and continuing the etherification until there is produced a cellulose ether which is insoluble in water, but soluble in aqueous alkaline solutions of 0.5 to 4.0% concentration. When the low-substituted cellulose ether, i.e., one which is soluble in aqueous alkaline solutions of 5 to 10% concentration, is washed, the washed mass may be further etherified without drying, or with practically complete drying, or with partial drying to a water content of from 15 to 70%.

For the alkylating agent there may be employed the alkyl esters of inorganic acids, for example, dimethyl sulphate, diethyl sulphate, methyl sodium sulphate and the like, and alkyl halides, e.g. methyl chloride, ethyl chloride, methyl bromide, ethyl bromide and the like; as hydroxyalkylating agents, the alkylene oxides, e.g. ethylene oxide, propylene oxide, glycides and the like, and halohydrins such as ethylene chlorhydrin, propylene chlorhydrin, glycerine chlorhydrin, epichlorhydrin and the like, and as carboxyalkylating agents, chloroacetic acid, chloropropionic acid, sodium chloroacetate, chloroacetamide and the like. The expression "cellulose ether" is intended to include simple alkyl ethers, hydroxyalkyl ethers, carboxyalkyl ethers, mixed alkly hydroxyalkyl ethers, mixed alkly carboxyalkyl ethers, and the salts of the carboxyalkyl ethers.

The alkaline medium in, or in the presence of, which the etherification is effected may be an aqueous solution of a strong inorganic or organic alkali, such as lithium, sodium, and potassium hydroxides, and strong organic nitrogen bases, for example, suitable quaternary substituted ammonium bases, such as quaternary alkylaralkyl ammonium hydroxide, an example of which is trimethyl benzyl ammonium hydroxide; quaternary ammonium hydroxide, an example of which is tetra n-propyl ammonium hydroxide; and quaternary aralkyl ammonium hydroxide, an example of which is tetra benzyl ammonium hydroxide. Further examples of suitable quaternary ammonium bases are dimethyl dibenzyl ammonium hydroxide, trimethyl phenylmethyl ammonium hydroxide, trimethyl cresyl ammonium hydroxide, tetramethyl ammonium hydroxide, triethyl benzyl ammonium hydroxide, tetra isopropyl ammonium hydroxide, cyclo butyl trimethyl ammonium hydroxide, etc. Also any amine which is strongly basic in aqueous solution may be employed as, mono- and dimethyl amines, ethylamine, aniline, pyridine, ethylene diamine and the like. The concentration of alkali initially should be at least 15%.

After the water-insoluble, alkali-soluble cellulose ether has been produced, the remaining alkali may be neutralized by the addition of an acid to the reaction mass, or by stirring the reaction mass into an excess of dilute acid. When employing excess dilute acid, the colloidal solution or dispersion thus obtained, containing the water-insoluble, alkali-soluble cellulose ether and the small amount of acid salt, may be used directly. When it is desired or necessary to employ a salt-free product, the water-insoluble, alkali-soluble cellulose ether may be separated from the colloidal solution or dispersion, washed with water, preferably hot water, until it is free of the acid salt and then dried. One outstanding advantage of the present invention is the fact that while the cellulose ethers are used in the form of an aqueous acid or a substantially neutral solution, they are water-insoluble and can be purified by washing with water when it is desired to remove the salts and ether impurities formed during the etherification reaction.

In preparing the dried purified product for use, it is dissolved in an aqueous alkaline solution of from 0.5 to 4.0% concentration, and when solution is complete, the required amount of acid, either in solid, liquid, or solution form, is added, with or without dilution of the aqueous solution with water and/or ice before or after addition of the acid. The resulting colloidal solution may have a pH of from 5 to 9 and is fluid, free of gels, and in a condition for direct use or application without further treatment.

The neutral or acid colloidal solutions comprising the water-insoluble alkali-soluble cellulose ethers can be used directly for the production of shaped articles such as filaments, films, sheets, foils, tubes, etc. They may also be used directly as or in textile or paper finishes, sizes, coatings, in which they are particularly useful where the coatings or impregnants contain photosensitive substances, and in or as printing pastes. For these purposes, it is only necessary to apply the cellulose ether compositions and either dry them or allow them to dry in the air. The stable colloidal solutions may also be used as dispersing and thickening agents for pigments and dyes for use in printing and pad-dyeing textiles, paper and the like. Since the cellulose ethers are water-insoluble they may be used as or in waterproofing compositions.

By way of illustration, the following is given as an example of the present invention: 333 parts of alkali cellulose containing 100 parts of alpha cellulose and 50 parts of sodium hydroxide were placed in a shredder and 20 to 80 parts of ethylene oxide were added over a period of 5 hours with constant stirring, the temperature being maintained at 20° C. The period for the addition of etherifying agent may vary between 1 and 20 hours and the temperature may vary between 15 and 50° C. The reaction mixture was allowed to age for 20 hours at 20° C. after which the alkali remaining was neutralized or acidified by the addition of 60 to 176 parts of 70% phosphoric acid. The aging time may vary from 0 to 240 hours and the aging temperature may be such that it falls within the range of 15 to 50° C. The mass was then washed with water at a temperature of 90° C. until it was free of salts and other impurities and then was dried. The resulting product was a hydroxyethyl cellulose ether containing on an average the equivalent of 0.3 to 1.3 hydroxyethyl groups per glucose residue ($C_6H_{10}O_5$), and was soluble in 0.5 to 4% aqueous sodium hydroxide at ordinary temperatures or on chilling or freezing. Hydroxyethyl cellulose ethers containing on an average the equivalent of 0.3 to 1.3 hydroxyethyl groups per glucose residue are suitable for the practice of the present invention. The solubility of the cellulose ether also depends upon such factors as degree of polymerization, particle size, uniformity of substitution, etc.

Six parts of the hydroxyethyl cellulose ether, produced as outlined above, were wet with 60 parts of water and added with stirring to 32 parts of water containing 2 parts of sodium hydroxide. When solution of the ether was complete, enough acetic acid was gradually added, with stirring, so that the resulting solution comprising the alkali-soluble, water-insoluble hydroxyethyl cellulose ether and sodium acetate had a pH in the range of 5 to 9. The solution was fluid and there was no tendency of the cellulose ether present therein to gel on standing or when the solution was diluted with water or ice.

Stable cellulose ether dispersions were prepared in the same manner by dissolving the hydroxyethyl cellulose ether in the dilute sodium hydroxide solution and adding enough of the following acids to form dispersions having a pH in the range of 5 to 9, namely, formic acid, propionic acid, butyric acid, maleic acid, xylic acid (2,4 dimethyl benzoic acid) and fluosilicic acids. The respective dispersions, therefore, contain sodium formate, sodium propionate, sodium butyrate, sodium maleate, sodium xylate and sodium fluosilicate.

Other specific water-insoluble, alkali-soluble cellulose ethers which form stable solutions, free of caustic alkali and having a pH between 5 and 9 include methyl cellulose containing on an average the equivalent of 0.5 to 1.3 methyl groups per glucose residue, ethyl cellulose containing on an average the equivalent of 0.5 to 1.3 ethyl groups per glucose residue, and carboxymethyl cellulose containing on an average the equivalent of 0.05 to 0.8 carboxymethyl groups per glucose residue. Here again, solubility depends also upon such factors as degree of polymerization, particle size, uniformity of substitution, etc.

The solutions prepared as described above may be used by simply applying them to surfaces in any conventional manner and drying them, or they may be formed into unsupported objects or shapes of various kinds such as filaments or films and then dried or allowed to dry to give products which are water-insoluble.

The stable colloidal solutions or dispersions of alkali-soluble, water-insoluble cellulose ethers, of the present invention, may be tailored to special uses by selection of the alkali present in the solution, and of the acid added to the alkaline solution to adjust the pH between 5 and 9. For example, if it is intended to employ the cellulose ether as a thickening agent for paints, the alkali-soluble, water-insoluble cellulose ether may be dissolved in 3% aqueous barium hydroxide and the subsequent solution neutralized by the addition of sulfuric acid. The barium sulfate formed by the neutralization is commercially used as a white pigment in paints. If it is intended to utilize the cellulose ether in a sizing, coating, or finishing composition, the ether may be dissolved in from 0.5 to 4% aqueous sodium or potassium hydroxide, and then neutralized by the addition of acetic acid. The resultant sodium or potassium acetate that is formed acts as a plasticizer for the composition. For producing flameproofing compositions the alkali-soluble, water-insoluble cellulose ether may be dissolved in 0.5 to 4% sodium hydroxide, neutralized by means of boric acid, and subsequently heated or treated with zinc sulfate or the like. Other known flameproofing materials, such as silica or sodium silicate may be added. Waterproofing compositions may be obtained by dissolving the alkali-soluble cellulose ether in 0.5 to 4% sodium hydroxide, neutralizing the resulting solution with acetic acid, and thereafter adding other known waterproofing substances to the neutralized or acidic solution, such as aluminum acetate. Such compositions need only be applied and heated to provide excellent waterproof coatings. Also, the water resistance of these compositions may be increased by incorporating in the neutral or acid aqueous colloidal solutions or dispersions of the alkali-soluble, water-insoluble cellulose ethers such substances as formaldehyde, glyoxal, urea-formaldehyde resins, melamine-formaldehyde resins, etc. These compositions are particularly useful as waterproofing agents for paper and textiles.

The neutral and/or acid colloidal solutions which may be obtained in accordance with the invention are compatible with numerous colloids, such, for example, as viscose, cuprammonium solutions, and solutions of cellulose in various organic and inorganic solvents which are not coagulating agents for the ether, latex, aqueous artificial rubber dispersions; gums; natural and synthetic resins; casein; gelatin; water-soluble cellulose ethers and other hydrophilic colloids, waxes; fats; and minerals and vegetable oils.

This application is a continuation-in-part of my copending application Serial No. 138,260, filed January 12, 1950, now abandoned.

It is to be understood that changes and variations may be made without departing from the spirit and scope of the invention as defined in the appended claims.

I claim:

1. A composition of matter comprising a stable, colloidal dispersion of a water-insoluble hydroxyethyl cellulose ether in an aqueous medium having a pH between 5 and 9, the cellulose ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and an alkali metal salt selected from the group consisting of formates, acetates, propionates, butyrates, maleates, xylates and fluosilicates.

2. A composition of matter comprising a stable, colloidal dispersion of a water-insoluble hydroxyethyl cellulose ether in an aqueous medium having a pH between 5 and 9, the cellulose ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and an alkali metal acetate.

3. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and an alkali metal propionate.

4. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and an alkali metal maleate.

5. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and an alkali metal fluosilicate.

6. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an alkali metal hydroxide, the aqueous medium consisting essentially of water and sodium acetate.

7. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and potassium acetate.

8. A composition of matter comprising a stable, colloidal dispersion of water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and sodium propionate.

9. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and sodium maleate.

10. A composition of matter comprising a stable, colloidal dispersion of a water-insoluble hydroxyethyl cellulose ether in an aqueous medium having a pH between 5 and 9, the ether having on an average the equivalent of 0.3 to 1.3 hydroxyethyl groups per glucose residue and being soluble in an aqueous solution containing from 0.5% to 4% of an alkali metal hydroxide, the aqueous medium consisting essentially of water and sodium fluosilicate.

References Cited in the file of this patent

UNITED STATES PATENTS

| | | |
|---|---|---|
| 2,331,858 | Freeman et al. | Oct. 12, 1943 |
| 2,469,764 | Erickson | May 10, 1949 |

OTHER REFERENCES

Schorger et al.: Jour. Ind. and Eng. Chem. 29, 114–7 (1937).